3,091,641
PREPARATION OF TERTIARY AMINES
William M. Sweeney, Wappingers Falls, N.Y., assignor to Texaco Inc., New York, N.Y., a corporation of Delaware
No Drawing. Filed Dec. 28, 1959, Ser. No. 862,060
6 Claims. (Cl. 260—583)

The present invention relates to the preparation of tertiary amines and, more particularly, to the preparation of tertiary amines from a secondary amine and an aliphatic ketone by reaction with carbon monoxide and water in the presence of an iron carbonyl catalyst.

The reaction can be represented by the following equation:

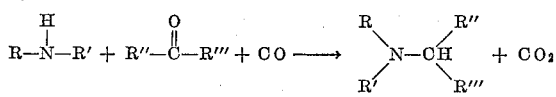

wherein R, R', R'' and R''' each represents an alkyl group or an aralkyl group or a cycloalkyl group, the alkyl portion or group containing from 1 to 7 carbon atoms and wherein at least one of the R'' and R''' groups is an alkyl group. It is preferred that the groups R, R', R'', R''' represent lower alkyl groups containing from 1 to 4 carbon atoms.

The tertiary amine products obtained by the process of the present invention are useful as chemical intermediates and also find particular utility in the preparation of quaternary ammonium complexes which are used as disinfectants and fungicides.

In accordance with the present invention, the process comprises reacting in the substantial absence of molecular hydrogen and in the liquid phase a mixture containing a secondary amine and an aliphatic ketone with carbon monoxide and water in the presence of an iron carbonyl catalyst at an elevated temperature and a superatmospheric pressure and recovering from the resulting reaction products the formed tertiary amine.

In carrying out the process of the present invention, it is necessary that the reaction be carried out in the presence of water and an organic liquid medium consisting of an aliphatic ketone such as for example, acetone, methylethylketone, propyl- or butyl-ketone or isomers thereof, and the like. Mixtures of these ketones can be employed successfully. The liquid medium also serves as a diluent or solvent for the amine reactant. It is important to avoid the use of alkanols as the liquid reaction medium so as to prevent formation of amides.

The reaction is conducted at moderate temperatures and for efficiency and economy should be carried out at temperatures not substantially greater than about 375° F. It is preferred that the reaction be carried out at a temperature within the range of from about 200° to about 350° F. for the most satisfactory results.

The reaction may be conducted at the autogenous pressure of the reactants and reaction products or at any superatmospheric pressure but, for the most part, it is desirable to employ pressures in excess of about at least 500 p.s.i.g., and advantageously, above about 1000 p.s.i.g. The preferred pressure range for carrying out the process of the invention is between about 2000 to about 6000 p.s.i.g.

Suitable catalyst compositions for employment in the process of the present invention include biscyclopentadienyl diiron tetracarbonyl and iron pentacarbonyl or their homologs.

Hereinafter, when reference is made to the term "iron carbonyl catalyst," it is to be understood that either of these iron compounds or their homologs is meant. The catalyst is advantageously employed in amounts of from 1.0% to 3.0% by weight, based on the weight of the reaction mixture for satisfactory results.

It is desirable that the reaction be carried out with agitation, preferably by mechanical means. The process of the present invention is capable of being conducted as a batch operation or in a continuous manner.

The recovery of the tertiary amine from the products of reaction can be accomplished readily in a known manner, such as, for example, by stripping, fractional distillation, and/or azeotropic distillation, and the like.

The following examples serve to illustrate the process of the invention. In the examples, the percentages are given on a weight basis unless otherwise specifically indicated. The carbon monoxide utilization was measured at 70° F.

Example 1

Into a 1.5 liter stainless steel reactor bomb provided with an agitator, there was charged 100 grams of dimethyl amine, 232 grams of acetone, 72 grams of water and 10 grams of dicyclopentadienyl diiron tetracarbonyl. The materials were admixed, then the reactor was pressured with carbon monoxide until a pressure of 3000 p.s.i.g. was attained. The bomb was heated to a temperature of 350° F. and maintained at such temperature for 2.75 hours. After cooling to room temperature, the pressure in the reactor was 2150 p.s.i.g., indicating that the carbon monoxide absorption was 850 p.s.i.g. The reaction products consisted of 175 grams of an oil layer and 60 grams of solids. The solids and the oil phase were combined and dissolved in concentrated hydrochloric acid; steamed to remove non-basic materials; then made basic by adding thereto sodium hydroxide. The oil layer separating therefrom was dried over solid potassium hydroxide to yield, on weighing, 14 grams of product identified on analysis as dimethyl isopropyl amine.

Example 2

Following the procedure set forth in Example 1, 100 grams of dimethyl amine, 316 grams of methylethylketone, 79 grams of water and 10 grams of the catalyst used in Example 1 were pressurized to 3000 p.s.i.g. in the 1.5 liter reactor with carbon monoxide. The reactor was heated to 350° F. and maintained at that temperature for three hours. The pressure drop was 875 p.s.i.g. at 70° F. The reaction products were dissolved in concentrated hydrochloric acid, steamed to remove non-basic materials and made basic by the addition of sodium hydroxide. The resulting oil layer was dried over solid potassium hydroxide and distilled. A 20 milliliter heart cut of the distillate was identified on analysis by physical and chemical properties as dimethyl secondary-butyl amine.

Example 3

The following materials were pressurized in an agitated reactor to 3000 p.s.i.g. with carbon monoxide: 100 grams of dimethyl amine, 72 grams of water, 237 grams of acetone and 10 grams of iron pentacarbonyl.

The reaction vessel was heated to 350° F. and maintained at this temperature for 2.75 hours. After cooling the bomb to 70° F., the bomb pressure was 2325 p.s.i.g. indicating a carbon dioxide absorption of 675 p.s.i.g. The reaction product consisted of water and oil layers and a solid phase. The oil layer and solid phase were combined and dissolved in concentrated hydrochloric acid, then steam distilled to remove non-basic materials. Thereafter, the solution was rendered basic by addition of excess sodium hydroxide. There was recovered from the basic solution an oil layer in an amount of 15 ml. (11 grams) which was identified, on analysis, as dimethyl isopropyl amine.

Example 4

A reaction mixture comprising 129 grams of dibutyl amine, 356 grams of acetone, 36 grams of water, and 10 grams of biscyclopentadienyl diiron tetracarbonyl was pressurized with carbon monoxide in a reaction bomb until a pressure of 3000 p.s.i.g. was attained. The bomb was then heated to 350° F. and maintained at such temperature for a period of 6.5 hours to effect conversion of the reactants. The residual cold pressure in the bomb indicated the absorption of 700 p.s.i.g. of carbon monoxide.

There was recovered from the resulting reaction products a compound identified on analysis as di(n-butyl) isopropyl amine. The yield of amine was 22% by weight, basis starting secondary amine.

In order to check the efficacy of the iron carbonyl catalyst, two experiments were run under similar conditions.

Example 5

The following materials were pressurized in an agitated 1.5 liter pressure vessel to 3000 p.s.i.g. with carbon monoxide: 129 grams of dibutyl amine, 356 grams of acetone, 36 grams of water and 10 grams of cobalt octacarbonyl. The bomb was heated to 350° F. and maintained at that temperature for 3 hours. Distillation of the resulting heated materials yielded no identifiable products other than the starting materials.

Example 6

Following the procedure of Example 5, 112 grams of dibutyl amine, 580 grams of acetone, 90 grams of water and 10 grams of biscyclopentadienyl iron were charged to the reaction vessel and the pressure therein increased to 3000 p.s.i.g. with carbon monoxide. After being heated to and maintained at 350° F. for 3 hours the contents of the vessel, after cooling, were distilled. No products other than the starting materials could be isolated.

I claim:

1. Process for the preparation of a tertiary amine which comprises reacting in the absence of molecular hydrogen a dialkylamine and an alkanone with carbon monoxide and water in the presence of from 1 to 3 wt. percent, based on the weight of the reaction mixture, of a catalyst selected from the group consisting of iron pentacarbonyl and biscyclopentadienyl diiron tetracarbonyl, at an elevated temperature and between about 200 and 375° F., and at a pressure of between about 500 and 6000 p.s.i.g.

2. Process as claimed in claim 1, wherein the secondary amine is represented by the formula $$R-\underset{\underset{H}{|}}{N}-R'$$

wherein R and R' each represents an alkyl group, and each of said alkyl groups contains from 1 to 4 carbon atoms.

3. Process as claimed in claim 1, wherein the aliphatic ketone is represented by the formula $$R''-\underset{\underset{O}{\|}}{C}-R'''$$

wherein R'' and R''' each represents an alkyl group, and each of said alkyl groups contains from 1 to 4 carbon atoms.

4. Process as claimed in claim 1 wherein the reaction is conducted at a temperature within the range of from 200° to 350° F., and a pressure within the range of from 2000 to 6000 p.s.i.g.

5. Process as claimed in claim 1 wherein the iron carbonyl catalyst is dicyclopentadienyl diiron tetracarbonyl.

6. Process as claimed in claim 1 wherein the iron carbonyl catalyst is iron pentacarbonyl.

References Cited in the file of this patent

UNITED STATES PATENTS

| 2,499,172 | Smith | Feb. 28, 1950 |
| 2,511,476 | Loder et al. | June 13, 1950 |

OTHER REFERENCES

Reepe: "Acetylene Chemistry, P. B. Report, 18852-s," p. 190 (1949).

Wagner et al.: "Synthetic Organic Chemistry," pp. 660—661 (1958). (Copies of above in Scientific Library.)